United States Patent [19]
Arends et al.

[11] Patent Number: 5,038,088
[45] Date of Patent: * Aug. 6, 1991

[54] STEPPER MOTOR SYSTEM

[76] Inventors: Gregory E. Arends, 604 Dawes St., Libertyville, Ill. 60048; James R. Polzin, 1216 N. Cross St., Wheaton, Ill. 60187

[*] Notice: The portion of the term of this patent subsequent to Oct. 18, 2005 has been disclaimed.

[21] Appl. No.: 546,704

[22] Filed: Jun. 29, 1990

Related U.S. Application Data

[63] Continuation of Ser. No. 462,936, Jan. 3, 1990, abandoned, which is a continuation of Ser. No. 336,617, Apr. 6, 1989, abandoned, which is a continuation of Ser. No. 253,425, Oct. 4, 1988, abandoned, which is a continuation of Ser. No. 819,202, Jan. 15, 1986, Pat. No. 4,779,031, which is a continuation-in-part of Ser. No. 814,687, Dec. 30, 1985, abandoned.

[51] Int. Cl.$^5$ .............................................. H02P 8/00
[52] U.S. Cl. .................................... 318/565; 318/434; 318/685; 318/696; 388/815; 388/903; 388/907 J; 388/934; 310/58; 310/62; 310/68 R
[58] Field of Search ............... 318/138, 254, 696, 685, 318/563, 565, 439; 361/20-29, 401, 393-399; 310/16, 17, 19, 51, 68 C, 88, 89, 68 R, 68 D, 52, 62, 63, 227, 67 R, 156, 194, 64, 58, 80, 54, DIG. 6; 388/815, 903, 907.5, 934

[56] References Cited

U.S. PATENT DOCUMENTS

| | | | |
|---|---|---|---|
| 3,229,130 | 1/1966 | Drouard | 310/54 |
| 3,277,346 | 10/1966 | McAdam et al. | 361/393 X |
| 3,386,019 | 5/1968 | Hill | 318/254 X |
| 3,531,702 | 9/1970 | Hill | 318/138 |
| 3,538,361 | 11/1970 | Hilterbrick et al. | 310/58 X |
| 3,569,804 | 3/1971 | Studer | 318/138 |
| 3,707,638 | 12/1972 | Nailen | 318/138 X |
| 3,809,935 | 5/1974 | Kristen et al. | 310/68 R |
| 4,072,888 | 2/1978 | Bechtle et al. | 318/685 |
| 4,097,790 | 6/1978 | Wilson | 318/334 X |
| 4,134,055 | 1/1979 | Akamatsu | 318/616 |
| 4,191,245 | 3/1980 | Wendt et al. | 310/62 X |

(List continued on next page.)

FOREIGN PATENT DOCUMENTS

| | | | |
|---|---|---|---|
| 0063549 | 5/1980 | Japan | 310/52 |
| 0226648 | 12/1984 | Japan | 310/DIG. 6 |

OTHER PUBLICATIONS

RIFA Data Sheet PBA 3219, "Integrated Circuits", Oct. 1983.

(List continued on next page.)

Primary Examiner—Paul Ip

[57] ABSTRACT

An electrical stepper motor system is provided in which a microcomputer controlled driver monitors the real time operating parameters of the stepper motor. The driver is controlled by the microcomputer to keep the real time operating parameters of the motor in a range that is governed by limiting parameters. The limiting parameters are determined by the microcomputer on a moment by moment basis in response to changes in certain conditions occurring within the stepper motor, as well as in the outside operating environment. The microcomputer compares the microcomputer determined safe operating parameters with any user stipulated operating parameters, stored in the storage means of the microcomputer, to determine limiting parameters on a moment by moment basis. An encoder senses the position and velocity of the motor and provides appropriate status signals to enable the driver to compensate for position and velocity errors of the stepper motor. An indexer is also provided which provides the driver with pulses that determine the distance, speed and direction of a move. In the illustrative embodiment, the driver, microcomputer, indexer, power supply and encoder circuitry are hybridized on at least one hybrid circuit, each circuit being attached to a heat sinking system, potted in a series of thermally conductive and EMI/RF insulating compounds, and are enclosed in a metallic enclosure that is shielded from outside electrical noise, with the enclosure being directly coupled to the back of the stepper motor to form a compact, unitary device.

8 Claims, 7 Drawing Sheets

U.S. PATENT DOCUMENTS

| | | | |
|---|---|---|---|
| 4,205,246 | 5/1980 | Wise et al. | 310/68 C |
| 4,259,603 | 3/1981 | Uchiyama et al. | 310/67 R X |
| 4,266,152 | 5/1981 | Herr et al. | 310/62 X |
| 4,317,176 | 2/1982 | Saar et al. | 318/434 X |
| 4,329,636 | 5/1982 | Uchida et al. | 310/68 R X |
| 4,409,530 | 10/1983 | Neeper et al. | 318/685 |
| 4,482,847 | 11/1984 | Rudich, Jr. et al. | |
| 4,547,826 | 10/1985 | Premerlani | 361/27 X |
| 4,550,277 | 10/1985 | Carney | 318/434 X |
| 4,554,473 | 11/1985 | Muller | 310/67 R |
| 4,558,245 | 12/1985 | Glasauer et al. | 310/DIG. 6 X |
| 4,574,226 | 3/1986 | Binder | 318/334 X |
| 4,591,774 | 5/1986 | Ferris et al. | 318/685 X |

OTHER PUBLICATIONS

Hurst "Stepping Motor Controller", brochure.
Semix Rorze document.
Compumotor Corporation DH Series Indexer Drive brochure.
Interloop Model #200 catalog sheet.
Advanced Micro Systems, Inc. SM-2 brochure.
Fasco Type 04 catalog sheet.
Panasonic Industrial Brushless DC Fan Motor publicity.
Product Design & Development sheet, "AC Motor Starting Switch".
Papst document.
Unitrode Corporation, Stepper Motor Drive Circuit brochure.
RIFA PBL 3717 brochure.
Sigma Instruments, Inc., PBD 3517 brochure.
Sigma Instruments, Inc., Model 29B brochure.
Sigma Instruments, Inc., Model 29A brochure.
Superior Electric, Catalog MMC781-4 (1984).
Superior Electric, Catalog MSX1084 (1984).
Slo-Syn DC Stepping Motors Document.
Superior Electric, "Slo-Syn DC Stepping Motors", catalog (1979).
Compumotor Corporation 90-page catalog.

STEPPER MOTOR SYSTEM

This application is a continuation of U.S. application Ser. No. 462,936, filed Jan. 3, 1990, now abandoned, which is a continuation of U.S. application Ser. No. 336,617, filed Apr. 6, 1989, now abandoned, which is a continuation of U.S. application Ser. No. 253,425, filed Oct. 4, 1988, now abandoned, which is a continuation of U.S. application Ser. No. 819,202, filed Jan. 15, 1986, now U.S. Pat. No. 4,779,031 issued Oct. 18, 1988, and is a continuation-in-part of U.S. application Ser. No. 814,687, filed Dec. 30, 1985, now abandoned.

FIELD OF THE INVENTION

The present invention concerns a novel electrical stepper motor system that is highly efficient and compact.

BACKGROUND OF THE INVENTION

In a conventional stepper motor system, the driver circuitry and the indexer circuitry is in the form of printed circuit boards (PCB) with integrated circuits and other discrete components soldered to copper traces that are photochemically etched on the board. The driver and indexer circuitry in a stepper motor is typically complex in comparison to the driver and indexer circuitry in non-stepper motor systems. In a PCB configuration, a stepper motor driver is typically large and bulky, thereby requiring a separate enclosure that is unattached to the motor and connected to the motor by a lengthy cable. Connected to the driver is an indexer which tells the driver how far, and at what speed, to advance the stepper motor. In addition, a separate power supply is connected to the driver and indexer.

There are inherent disadvantages in a conventional stepper motor system, however.

1. Size—Conventional driver circuits in a stepper motor system are comparatively large. A high power ½ step or micro step drive circuit is bulky and can not be reduced to a small enough size to be placed in a restrictive area or attached directly to a motor. The addition of an indexer or external power supply can significantly add to the size of the system.

2. Weight—When populated with components, the weight of the driver and indexer circuits can significantly reduce the benefits of using a conventional stepper motor system in weight sensitive industries such as the aerospace and aviation industries.

3. Heat Dissipation—The substantial heat dissipation requirements of a conventional stepper motor driver circuit prevents the driver from being mounted in restrictive areas or enclosures without ventilation. Conventional driver circuitry is complex and has many individual components populating a driver circuit, each having its own heat dissipation requirements. Because of the need to dissipate the heat of the individual components through the use of bulky heat sinks, a conventional driver circuit must be large by nature. Even with substantial heat sinking, a conventional driver can only be mounted in low temperature environments.

4. EMI/RF Emissions—Because of the large area on a PCB in which traces and components are exposed, a power switching circuit, such as a driver, will emit EMI/RF that can damage or interfere with EMI/RF sensitive devices located near the PCB. Many industries, such as the health care and semiconductor manufacturing industries, cannot use conventional stepper motor systems because of the EMI/RF noise they emit. In addition, as in the case of a driver located near a stepper motor, EMI/RF produced by an electrical motor may damage or interfere with the exposed EMI/RF sensitive devices located on the driver.

5. High-Frequency Performance—Because of variances in trace width, length and exposure, a PCB circuit is limited in its ability to handle high speed transmission of signals. As in the case when a stepper motor microsteps, a driver with limited high speed signal transmission capabilities would restrict a motor's speed, as well as limit the resolution a motor could possibly achieve. (Example: 50,000 steps per revolution verses 125,000 steps per revolution.) An additional problem occurs when the motor is not in very close proximity with the microsteps driver. The greater the distance that the signal must travel to the motor, the lower the possible speed and resolution a motor can achieve.

6. Circuit Performance—The performance of a PCB driver circuit is limited by the tolerances of the discrete resistors, capacitors, inductors, and traces used in the design, as well as the trace width, length and exposure variances on the PCB. The inability to fine tune the resistors, capacitors, inductors, and traces results in a circuit that is less efficient, less predictable, less reliable, less stable and with broad absolute specifications.

7. Fixed Operating Parameters—In conventional stepper motor systems, the distance between the motor, driver and indexer makes it difficult to monitor small, significant changes in the real time operating parameters, such as temperature and current, occurring at the motor. The inability to monitor these parameters has resulted in the inability to safely optimize a stepper motor's operating efficiency as determined by certain changes in its operating environment.

8. Assembly—Assembling a conventional stepper motor system in a product is time consuming, requiring manual placement and wiring. Errors can frequently occur when placement and wiring is done manually. These errors will often damage the system, and in some cases can cause personal injury.

9. Environment—Conventional driver and indexer circuits are not hermetically sealed. Exposure to humid environments will damage the circuits. In flammable environments, a short in the circuit could cause an explosion.

10. Safety—Damage done to a PCB drive circuit as a result of a hostile environment, or severing the external connecting wires, or inadequate heat dissipation can result in life threatening safety hazards, such as electrocution.

11. Mechanical Stability—In a conventional stepper motor system, the individual components on a driver circuit are not permanently potted in place, and say be become loose as a result of vibration.

In a conventional stepper motor system, the driver circuitry contains a switching means and a translating means. The indexer which is connected to the driver sends pulses to the translator. The pulses and the rate at which the translator receives the pulses determines the distance, speed and direction of a move. The translator then turns on and off the transistors in the switching circuit, thereby controlling the flow of current into the windings of the motor. In some sophisticated configurations, the indexer also contains circuitry for communicating with outside controls, thereby allowing a computer to send variable move commands to the indexer.

In certain "closed loop" applications, an encoder is connected to the stepper motor. The encoder provides feedback to the encoder interface circuitry, which translates the information to a means understandable by the indexer. The information can then be transmitted to the indexer enabling the indexer to correct for errors in the stepper motor's move. Typically the encoder is limited to final position sensing and adjustment.

There appears to be a trend to miniaturize. For example, in a prior art stepper motor system manufactured by Compumotor Corporation of Petaluma, Calif., a combination driver-indexer is combined in a single unit. However, the Compumotor system maintains the limitations of a conventional stepper motor system. Compumotor's driver-indexer combination remains large and heavy, and must remain separated from the motor itself. The combined unit still requires relatively lengthy wires between the driver means and motor. Faulty connections and wiring errors can still occur, possibly damaging the components in the circuit or causing electrocution. The unit still requires an external power supply, which must be manually wired to the unit. In addition, the unit and its associated wiring radiates electromagnetic interference that should be reduced, if possible. Finally, the unit and power supply still requires a relatively large amount of space, as well as the adaptability of the space to handle a significant amount of weight and heat dissipation.

Some companies, such as SGS—Semiconductor Corporation of Phoenix, Ariz.—have developed integrated circuit (IC) semiconductors which contain a number of components necessary to operate a small stepper motor. The ICs, however, are all low voltage, low current devices, which still require a separate power supply and indexer, thereby maintaining many of the problems associated with a conventional stepper motor system.

Semix, Incorporated of Fremont, Calif. offers a low voltage, low current driver for use with small stepper motors. The driver, which is in printed circuit board form, is potted in a metal enclosure that allows for better heat dissipation of the components, while decreasing EMI/RF noise radiated by the driver circuitry. The unit, however, has many limiting features. For example, the unit requires an external power supply. The step resolution that the unit can provide is limited to the number of full steps that can be achieved with a particular stepper motor. The unit requires external wiring between the driver and motor. These are only a few of the limiting aspects of Semix's driver.

It is an object of the present invention to provide a novel motor drive system that alleviates many of the problems concomitant with the motor drive systems of the prior art.

A further object of the present invention is to provide a stepper motor system that monitors the operating parameters of the stepper motor system.

Another object of the present invention is to provide a stepper motor system that is significantly reduced in size and weight from the stepper motor systems of the prior art.

A further object of the present invention is to provide a stepper motor system that has less heat generated than the heat generation of prior art stepper motor systems.

A still further object of the present invention is to provide a stepper motor system that enables significantly reduced EMI/RF emissions.

Another object of the present invention is to provide a stepper motor system in which assembly and connecting operations of the components are relatively easy to perform.

A further object of the present invention is to provide a stepper motor system that is compact in size and is effectively mounted within a small space.

Another object of the present invention is to provide a stepper motor system that is relatively simple in construction and easy to manufacture.

A still further object of the present invention is to provide a stepper motor system that has significant mechanical stability.

Another object of the present invention is to provide a stepper motor system that dissipates heat more efficiently than the prior art.

A further object of the present invention is to provide a drive package that can be easily adapted to stepper motors of various shapes and sizes.

A still further object of the present invention is to provide a stepper motor, drive circuit and control circuit in a unitary device.

Other objects and advantages of the present invention will become apparent as the description proceeds.

SUMMARY OF THE INVENTION

In accordance with one embodiment of the present invention, an electrical stepper motor system is provided. The system includes a stepper motor and driver means for actuating the stepper motor. Means are provided for monitoring real time operating parameters of the stepper motor. Monitoring means includes storage means containing a program which determines limiting parameters for the stepper motor.

Means are provided for sensing preselected operating parameters of the stepper motor. The monitoring means include means for comparing the sensed operating parameters with the limiting parameters and means responsive to the comparing means for controlling the drive means to maintain the real time parameters in a predetermined range governed by the limiting parameters.

In the illustrative embodiment, the preselected operating parameters include temperature and current, and the limiting parameters include maximum temperature and maximum current. Means are provided for operating the monitoring means on a moment to moment basis whereby substantially optimum power may be provided to the stepper motor from moment to moment in accordance with the changing motor power needs.

In the illustrative embodiment, encoder means are provided for sensing the position and velocity of the motor and for providing an output signal in response to the position and velocity of the motor. Means are provided for transmitting the encoder output signal to the monitoring means. The monitoring means includes means for providing a position and velocity compensating signal from the monitoring means to the driver means, to enable the driver means to compensate for position and velocity errors.

In the illustrative embodiment, a common housing is provided for the driver means, monitoring means, and encoder means with the housing including a metallic enclosure that is shielded against outside electrical noise. The housing is directly coupled to the back of the stepper motor to form a compact, unitary device.

In the illustrative embodiment, the driver means and the monitoring means are hybridized on at least one hybrid circuit. The hybrid circuit includes power supply means to operate the stepper motor system from direct line voltage. The hybrid circuit comprises a substrate, a metallization layer forming thick film and thin film electrical components, and monolithic semiconductor devices, other hybridized devices, and discrete components connected to the substrate. The hybrid circuit is potted in a thermally conductive compound, and a metal heat sink communicates with the compound to increase the dissipate heat capabilities of the hybrid circuit.

In the illustrative embodiment, a plurality of spaced power transistors are positioned along the heat sink in a heat conductive relationship therewith and are connected to the hybrid circuit.

A more detailed explanation of the invention is provided in the following description and claims, and is illustrated in the accompanying drawings.

DETAILED DESCRIPTION OF THE ILLUSTRATIVE EMBODIMENT

Figure 1A:
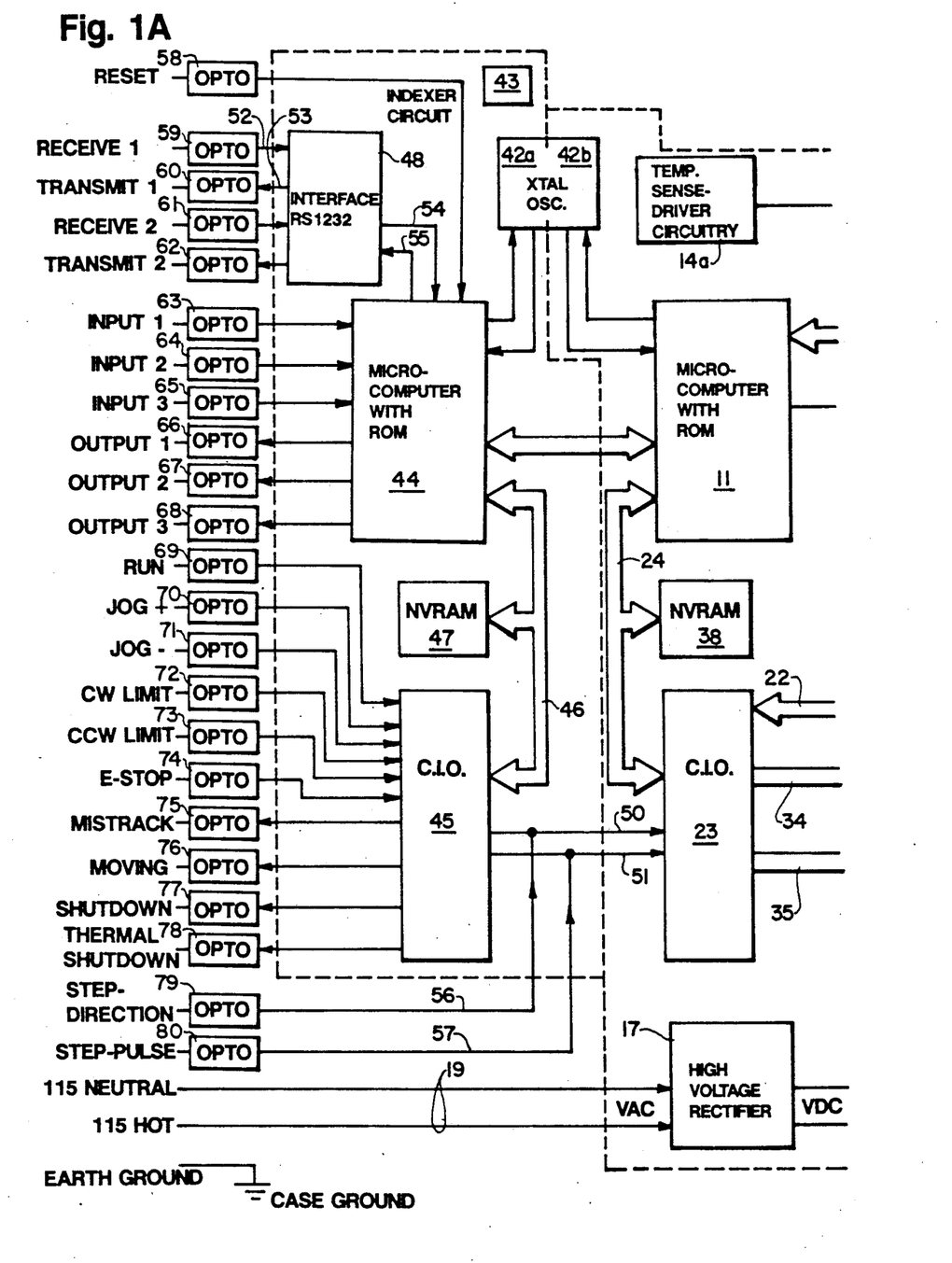
FIGS. 1A and 1B, when connected together, are a schematic block diagram of a stepper motor system constructed in accordance with the principles of the present invention.
Figure 1B:
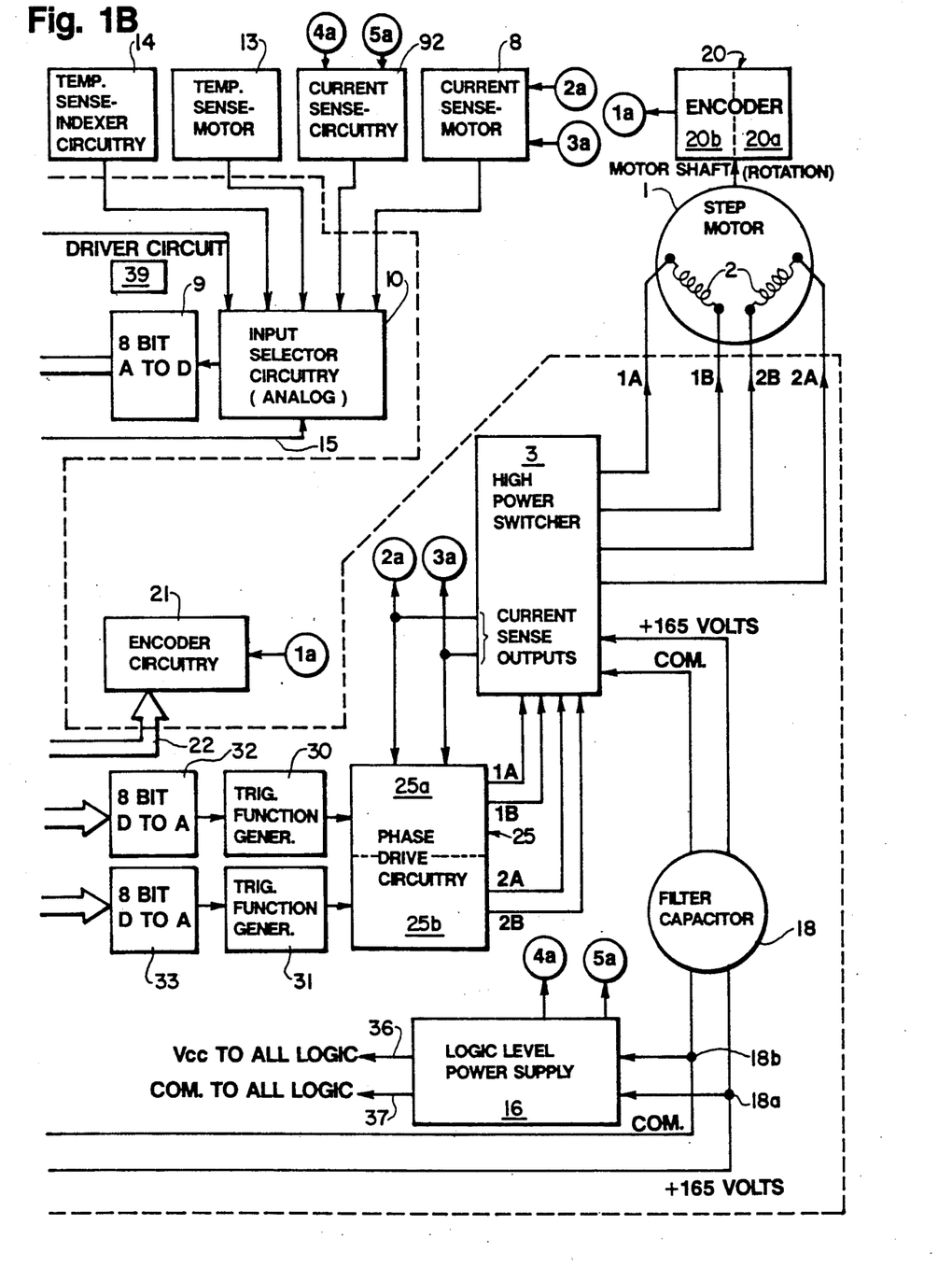

Referring to FIGS. 1A-1B, there is shown therein a stepper motor 1 having windings 2, the current to which is controlled by switcher 3 with respect to phase line 1a, 1b, 2a, and 2b. A microcomputer 11 with ROM controls switcher 3 through phase drive circuitry 25 which controls power transistors in switcher 3. Phase drive circuitry 25 comprises phase drive circuitry 25a which controls one of the two banks of power transistors located in switcher 3 via lines 26 and 27, and phase drive circuitry 25b which controls the other bank of power transistors in switcher 3 via lines 28 and 29. Phase lines 1a, 1b, 2a, and 2b of windings 2 are each coupled to current sensing means 8 through switcher 3. Current sensing means 8 is coupled to an analog to digital converter 9 via an analog input selector 10. The output of the analog to digital converter 9 is fed to microcomputer 11 with ROM which reacts to output by controlling switcher 3. The current sensing means 12 is coupled to logic lever power supply 16. The current sensing means 12 is coupled to analog to digital converter 9 via the analog input selector 10.

Figure 5:
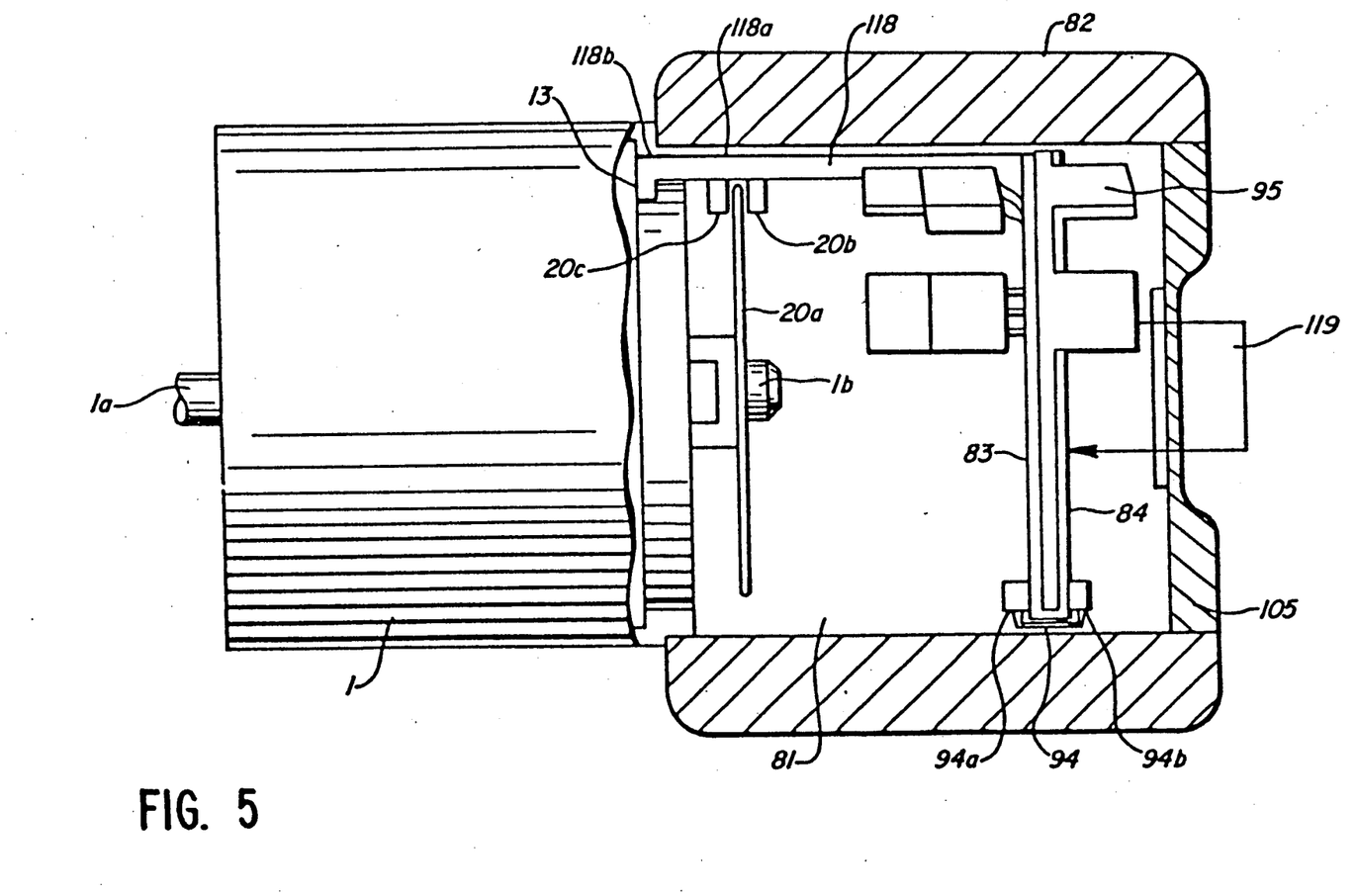
FIG. 5 is a cross-sectional view thereof, taken along the plane of the line 5—5 of FIG. 4.
Figure 10:
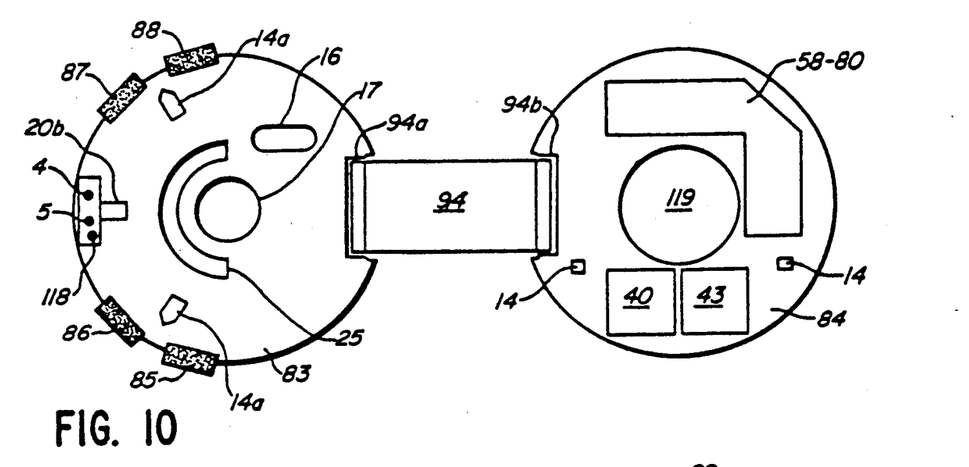
FIG. 10 is a top view of circuitry contained in FIG. 1 and constructed in accordance with the present invention.

The temperature of the stepper motor and control circuitry are sensed by temperature sensors 13, 14, and 14a. Temperature sensor 13 is attached to stepper motor 1 as illustrated in FIG. 5. Temperature sensor 13 is coupled to analog to digital converter 9 through analog input selector 10. Temperature sensors 14 and 14a are attached to hybrid substrates 84 and 83, respectively, as illustrated in FIG. 10. Temperature sensors 14 and 14a are coupled to analog to digital converter 9 through analog input selector 10. The outputs from temperature sensors 13, 14, and 14a are fed to the analog to digital converter 9 through the analog input selector 10. The output from analog to digital converter 9 is fed to the microcomputer 11, which reacts to output by controlling switcher 3. The microcomputer 11 controls outputs from sensors to analog to digital converter 9 via selector 10 which is controlled by way of bus 15.

The microcomputer 11 is connected to non volatile random access memory device 38 by way of bus 24. Memory device 38 stores the limiting parameters such as maximum operating temperature and maximum operating current of motor 1. The limiting parameters are determined by microcomputer 11 on a moment to moment basis in response to changes occuring within motor 1 and the outside operating environment. Memory device 38 is non volatile which allows for continued storage of limiting parameters during power outages.

As shown in FIG. 1 and described earlier in the text, microcomputer 11 is connected through an analog to digital converter 9 and an analog input selector 10 to temperature sensors 13, 14, and 14a and current sensing means 8 and 12. The purpose of this sensor network is to provide the microcomputer 11 with information concerning the internal and external operating conditions of the motor 1, driver circuit 39 and indexer circuit 43. Driver circuit 39 is defined within the dashed lines on the right hand side of FIG. 1, and indexer circuit 43 is defined within the dashed lines on FIG. 1A. The sensor network sends information to microcomputer 11. Microcomputer 11 monitors the information and uses the information to determine the range of operating parameters under which motor 1 can safely operate.

A number of user stipulated operating parameters may be provided by a user. If provided by user, the user stipulated operating parameters are stored in memory device 38. Microcomputer 11 compares the computer determined safe operating parameters with the user stipulated operating parameters to determine the limiting parameters which will govern the actual operating parameters of motor 1. The limiting parameters are determined by microcomputer 11 by an internal adaptive program. Microcomputer 11 controls the operation of motor 1 in a manner that keeps the operating parameters of motor 1 in a range governed by the limiting parameters.

Figure 14:
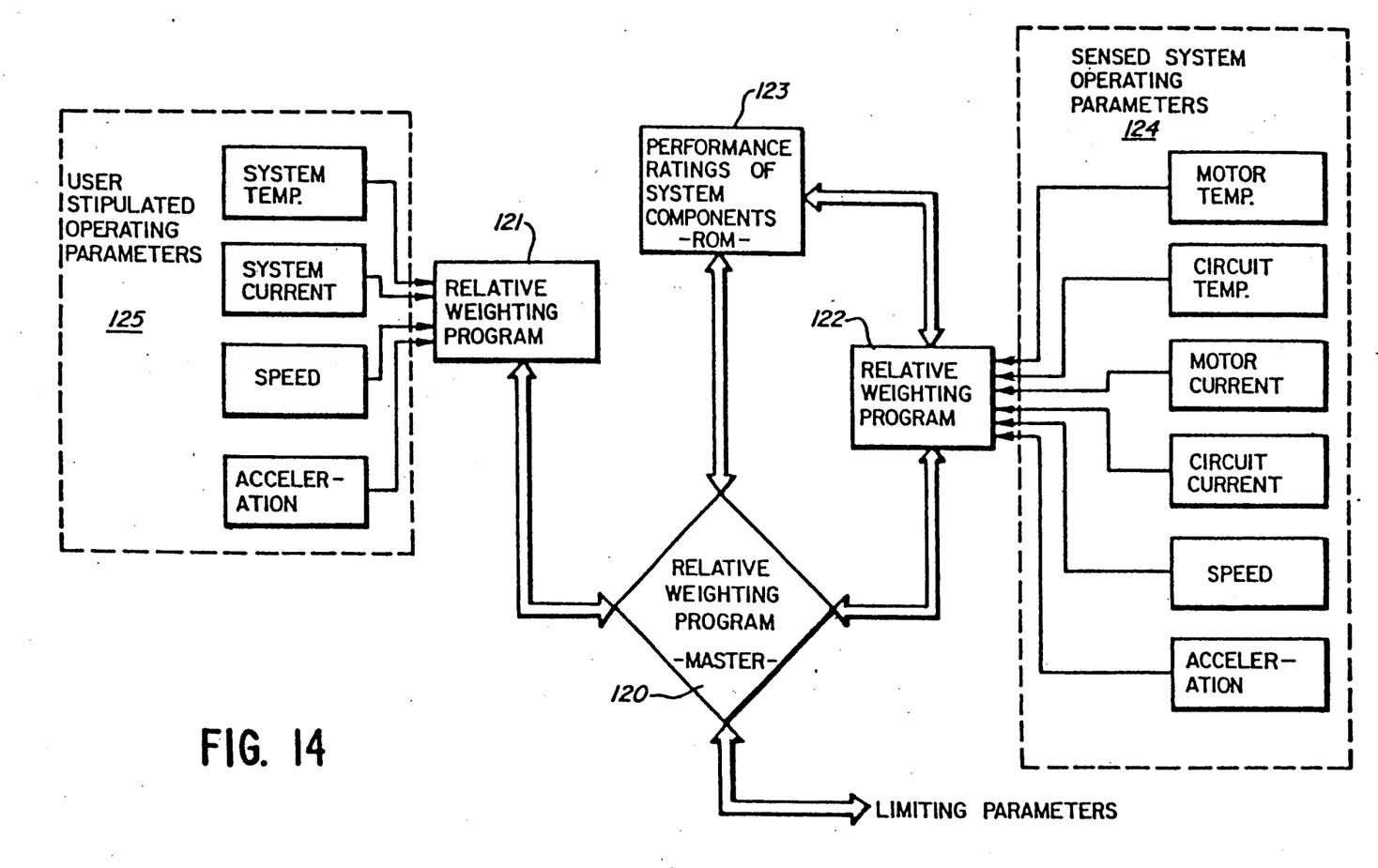
FIG. 14 is a block diagram of the decision-making program in the driver circuit.

It is noted that the manner in which the limiting parameters are determined by microcomputer 11 is a limited form of artifical intelligence. As illustrated in FIG. 14, the sensed system operating parameters 124 is defined within the dashed lines on the right hand side of FIG. 14 and user stipulated operating parameters 125 is defined within the dashed lines on the left hand side of FIG. 14. Relative weighting program 122 monitors sensed operating parameters 124 and compares sensed operating parameters 124 to the performance rated operating parameters of the system's components 123 to determine the safe operating parameters for the stepper motor system. The safe operating parameters are fed to the master relative weighting program 120 by relative weighting program 122. Master program 120 monitors the safe operating parameters and compares the safe operating parameters to the user stipulated operating parameters, which are fed to master program 120 via relative weighting program 121, and the performance rated operating parameters 123 to determine the limiting parameters.

The power transistors in switcher 3 and logic level power supply 16 are powered by a high voltage power supply made up of high voltage rectifier 17 and high voltage filter capacitor 18. The inputs 19 to the high voltage rectifier 17 of the high voltage power supply are coupled to a suitable alternating current supply. The logic level power supply 16 by way of positive voltage line 36 and common line 37 provides all power to each of the components in FIGS. 1A–1B with the exception of stepper motor 1, windings 2 and power transistors in switcher 3.

The switcher 3 is connected to the phase drive circuitry 25 through lines 26–29. The operation of phase drive circuitry 25 is governed by outputs from trigonometric function generators 30 and 31 which are controlled by signals from digital to analog converters 32 and 33, respectively. The digital to analog converters 32 and 33 are coupled to CIO controller and input/output circuit 23, which is a programmable pulse translator and generator, via bus 34 and 35, respectively, thereby enabling microcomputer 11 to control switcher 3 via bus 24, components 23, 32, 33, 30, 31, 25a, and 25b, respectively.

Pulses that signal step movement and direction of step movement are sent to CIO 23 via lines 50 and 51, by way of an external indexer via lines 56 and 57, respectively, or by indexer 43 via CIO 45 as described below. In addition, data that determines the resolution of each step is sent to CIO 23 by microcomputer 11 via bus 24. In a configuration in which an interface circuit (such as RS232 interface 48 in indexer 43 that would allow a programmer to communicate with microcomputer 11) is not present, the resolution of the motor is determined by default by the program permanently stored in the internal memory of microcomputer 11. In the configuration in which indexer 43 (which will be described in more detail below) is present, microcomputer 44 could be programmed via lines 52 and 53, which are coupled to microcomputer 44 via RS232 interface 48 by way of lines 55 and 54, to signal variable resolutions for subsequent moves. For example, during a specified move, the resolution of each step could equal 1/200th of a revolution of motor 1. During a subsequent move, the resolution of each step could equal 1/25,000th of a revolution, or some other fraction as determined by a system programmer. Microcomputer 44 could be programmed to signal variable resolutions for subsequent steps. For example, the first step in a two step move could equal 1/200th of a revolution of motor 1, and the second step could equal 1/25,000th of a revolution, or some other fraction as determined by a system programmer. Microcomputer 44 would communicate changes in step resolution to microcomputer 11 via bus 49, which in turn would communicate step resolution to CIO 23 via bus 24.

Crystal oscillator section 42 comprises crystal oscillators 42a and 42b. Crystal oscillator 42b is included in driver 39, and acts as the timing unit of driver 39. Crystal oscillator 42a is included in indexer 43, to be described below, and acts as the timing unit for indexer 43. Crystal oscillators 42a and 42b are connected together to allow all sections in FIG. 1 to operate synchronously.

Indexer circuitry 43 includes a microcomputer 44 with ROM, which controls the development and execution of an operating program; CIO controller and input/output circuit 45, which is a programmable pulse generating system and input/output interface, coupled to microcomputer 44 via bus 46; a non volatile random access memory 47, also coupled to microcomputer 44 via bus 46; an RS-232 interface 48 coupled to microcomputer 44 via lines 54 and 55; and crystal oscillator 42a coupled to microcomputer 44.

Interface 48 enables an external controller to communicate with the program in microcomputer 44. The memory device stores the operating program developed by the system programmer. Memory device 47 is non volatile which allows for continued storage of the operating program during power outages to the system. Using memory device 47, via the user interface program permanently stored in the internal memory of microcomputer 11, a system programmer can develop, test, store and alter a program on a step by step basis. Crystal oscillator 42a operates to time microcomputer 44.

As illustrated on the left hand side of FIG. 1, CIO 45 links microcomputer 44 via bus 46 with the external control inputs which include run, jog+, jog−, cw limit, ccw limit, E-stop, and internal outputs to an external controller which include mistrack, motor moving, motor shutdown and thermal shutdown. In addition, CIO 45 receives move commands from microcomputer 44 via bus 46, and in turn transmits step move pulses and direction move pulses to CIO 23 via lines 50 and 51.

All communication with the indexer 43 or the driver 39 is accomplished through the bank of optical isolators 58–80. These devices serve to isolate any external equipment from the high voltage present within the stepper motor system. Furthermore, optical isolators 58–80 serve to isolate the stepper motor system including driver 39 and indexer 43 from electrical noise and spurious signals that frequently occur outside of the stepper motor system.

Figure 4:
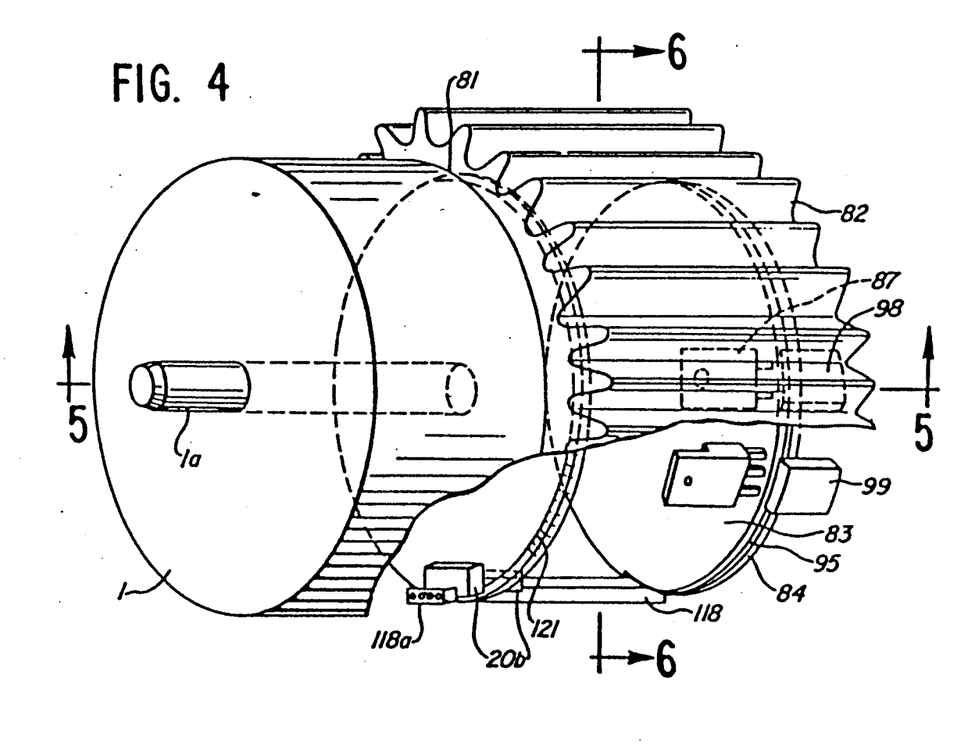
FIG. 4 is a perspective view, with portions broken away for clarity, of the stepper motor system constructed in accordance with the principles of the present invention.

The position and velocity of stepper motor 1 is sensed by the encoder system which comprises encoder 20, including encoder disc 20a and emitter/detector sensor 20b, and encoder circuitry 21. Encoder disc 20a, which is carried on motor 1 in a manner described below, carries about its periphery indicia 121, as illustrated in FIG. 4, which are read by encoder circuitry 21 via sensor 20b in that the indicia 121 pass through the slot 20c of sensor 20b (see FIG. 5). The position and velocity data which are obtained by the encoder circuitry 21 is fed directly to CIO 23. CIO 23 monitors the information on a moment to moment basis to determine if a position or velocity error has occurred, thereby allowing CIO 23 immediately to correct the signals being fed to motor 1 via switcher 3, thereby compensating for position and velocity errors as they occur. Errors are corrected on a step by step basis, so that any errors in the operation of motor 1 are corrected immediately.

In the prior art, when an encoder is used, the encoder circuitry 21 typically communicates position error back to an indexer, such as indexer 43, thereby requiring that a step error be corrected after the move as a whole is complete. In the illustrative embodiment of the present invention, encoder circuitry 21 transmits the position and velocity information obtained from encoder disc 20a and emitter/detector 20b directly to sections of the driver circuitry 39 in the manner described above. As a result, the correction for position and velocity errors is made directly at the driver control circuitry instead of the indexer circuitry. In this manner substantial delays have been eliminated, thereby allowing position and velocity errors to be corrected on a step by step, moment to moment basis. An additional benefit resulting from the encoder/driver closed-looped system described above is that errors correction programing in the indexer is eliminated, thereby simplifying the programing of the indexer.

It is noted that certain features concerning the layout of the circuitry contained in FIG. 1 have been intentionally added to allow for substantial flexibility in the packaging of the various parts of the circuitry, without effecting the performance of the system. As discussed in an earlier part of the test, the direction and step pulses to CIO 23 of driver 39 are provided via lines 50 and 51, via CIO 45, or external lines 56 and 57, respectively. This is an important feature in that external lines 56 and 57 allow the driver 39 to be provided apart from the indexer. Thus the driver 39 may be provided by itself. On the other hand, driver 39 may be provided with encoder 20. Further, the driver 39, encoder 20, and the indexer 43 can be provided as a unit.

It is preferred that all elements of driver 39 and indexer 43 of FIG. 1, as defined within the dashed lines, respectively, be hybridized on at least one hybrid circuit. The hybridized circuit of driver 39 and indexer 43 comprises an electrically insulating, thermally conductive substrate, a metallization layer forming thick film and thin film electrical components, monolithic semiconductor devices, other hybridized devices and discrete components connected to the substrate.

Figure 2:
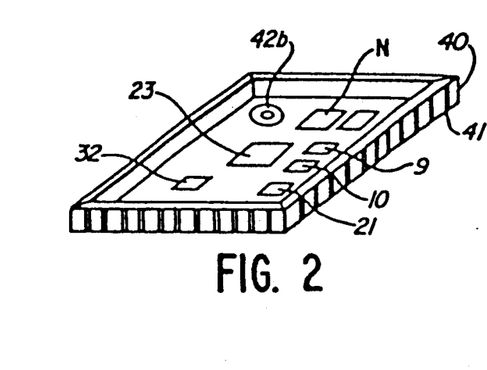
FIG. 2 is a perspective view of an indexer circuit constructed in accordance with the principles of the present invention.

The circuitry in FIG. 1 is hybridized on five hybrids 40, 43, 83, 84, and 118 is illustrated in FIGS. 2, 3, 4, and 10. Contained within the hybrid 40, as illustrated in FIG. 2, are sections 9, 10, 11, 21, 23, 30–33, 38, and 42b of FIGS. 1A-1B, which comprise the EMI/RF sensitive control circuitry of driver 39. The construction of hybrid 40 consists of combining sections 9, 10, 11, 21, 23, 30–33, and 42b with thick film and thin film electrical components and conductors on an electrically insulating and thermally conductive substrate. Hybrid 40 is further constructed by mounting the substrate in a standard leadless chip carrier in which eleven of the forty four contact points 41 are provided on the outer rim of each of the four sides of the chip carrier, and sealing the circuitry in a compound, thereby shielding the hybrid from EMI/RF noise.

Figure 3:
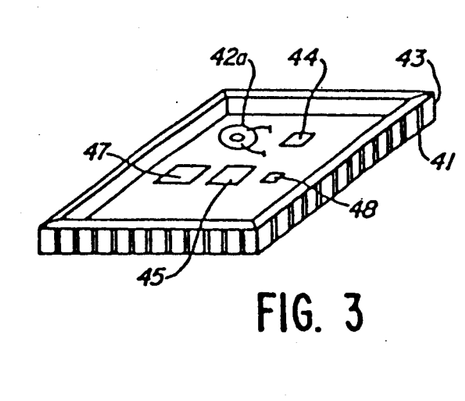
FIG. 3 is a perspective view of a part of the driver circuit constructed in accordance with the principles of the present invention.

The indexer circuitry is on hybrid 43, as illustrated in FIG. 3. Contained within hybrid 43 are parts 42a, 44, 45, 47, and 48 of FIG. 1A, and is constructed in the same manner as hybrid 40 described above.

Hybrids 83 and 84 are illustrated in FIG. 10. The substrates of hybrids 83 and 84 have the same conductive and insulating properties as described above, and are specificly formed in the shape of a disc with a notch on one end where connectors 94a and 94b, respectively, are connected. Contained within hybrid 84 are optical isolators 58–80 and temperature sensors 14 of FIGS. 1A-1B, hybrids 40 and 43 of FIGS. 2 and 3, respectively, and connector 119, all of which are combined with various thick film and thin film electrical components and conductors on disc shaped substrate as described above. Hybrid 84 is further constructed by sealing the circuitry in a compound, thereby shielding the hybrid from EMI/RF noise.

Hybrid 83 contains all parts of driver 39 of FIG. 1B, except those parts contained in hybrid 40 described above. Contained within hybrid 83 are the parts of driver 39 which comprise the power generation and control sections of driver 39, including the switcher 3 which contains transistors 85-92, the phase drive circuitry 25a and 25b, filter capacitor 18, rectifier 17, the logic level power supply 16, current sense circuitry 12 and the temperature sensor circuitry 14a. Transistors 85-92 are mounted to the outer rim of hybrid 83 in a circular pattern, the benefits of which will be discussed below. Hybrid 83 is constructed in the same manner as hybrid 84 described above. Hybrid 83 operates directly from an AC line, without the use of a transformer, and supplies logic level power to hybrid 84 via logic level power supply 16.

Referencing FIG. 4, it can be seen that there is a hybrid 118 perpendicular to hybrid 83. Contained within hybrid 118 are lines 4–7, encoder emitter/detector sensors 20b, line 1a, as illustrated in FIG. 1B, and connector 118a. The traces containing lines 4–7 and additional traces carried on hybrid 118 are terminated at the driver end with metal pins that allow hybrid 118 to be solded directly to hybrid 83. The traces containing lines 4–7 are terminated at the motor end of hybrid 118 with connector 118a that couples hybrid 118 directly to motor 1 via a connector 118b that is mounted in the rear end plate of motor 1, as illustrated in FIG. 5. Hybrid 118 is constructed in the same manner as hybrid 83 described above. It is noted that unlike conventional stepper motor systems in which lines 4–7 are wires or cabling that radiate EMI/RF noise, lines 4–7 on hybrid 118 are conductive traces formed in the hybridization process by a heavy metalization layer that is encased in an EMI suppressive compound and terminated at the motor end in a four pin female connector. Of additional importance, is that hybrid 118 is carried in housing 81 which is directly attached to motor 1, thereby completely shielding all external circuitry from the EMI/RF noise radiated by lines 4–7. Further, by replacing the wires or cabling between motor 1 and hybrid 83 with hybrid 118 with fixed connectors, an efficient assembly procedure is achieved whereby any miswiring that can occur in conventional stepper motor system is eliminated.

A further function of hybrid 118 is to accurately position the emitter/detector sensor 20b in relation to the encoder disc 20a as shown in FIG. 4. The encoder disc 20a is carried by shaft 1b of motor 1, as illustrated in FIG. 5, and is keyed to prevent slippage due to vibration, and rotates about shaft 1b. Encoder disc 20a carries about its periphery indicia 121, as illustrated in FIG. 4, which are read by encoder circuitry 21 via sensor 20b. Sensing of indicia 121 requires that accurate placement of sensor 20b be maintained during the operation of the motor. By mounting sensor 20b on hybrid 118, and securely attaching hybrid 118 to the inner wall of housing 81, and mounting housing 81 to the back of motor 1, the position of sensor 20b can be accurately made during assembly and maintained during operating of the motor.

It is noted that hybridization of the circuits shown in FIGS. 1A-1B allows for the trimming of the resistors, capacitors, conductors and inductors in the various metallization layers, via a laser beam, to achieve exact values, thereby creating a very accurate circuit whose exact performance specifications are known. This functional trimming of the metallization layers to achieve a more accurate circuit is only possible in a hybridized circuit, and allows for motor accuracies and speeds that are not possible with conventional drivers and indexer constructed with printed circuit board techniques. For example, because the circuitry in FIG. 1 is hybridized and carried integrally with motor 1, and assuming operating specifications of motor 1 and operating conditions in the work environment would allow for very fine resolutions and very high speeds, stepper motor 1 could operate at resolutions up to 250,000 steps per revolution or speeds up to 5,000 RPM, compared to resolutions and speeds of 50,000 and 1800 RPM, respectively, of conventional stepper motor systems.

The system is extremely compact and mechanically stable as a result of hybridizing the circuitry and placing the circuitry in a sealed enclosure on the back side of the stepper motor 1. The hybridized circuit is potted in place to effectively binding the hybrid substrates and power transistors of switcher 3 to the heat sinking system, discussed in detail below, thereby providing significant heat dissipation capabilities and mechanical stability of the system. Thus the components should not become loose as a result of vibration because they have been permanently potted in place. This is particularly significant in the use of a stepper motor which will normally produce significant vibrations. By potting the circuitry in place the vibrations of the motor will not operate to loosen the circuitry.

Figure 7:
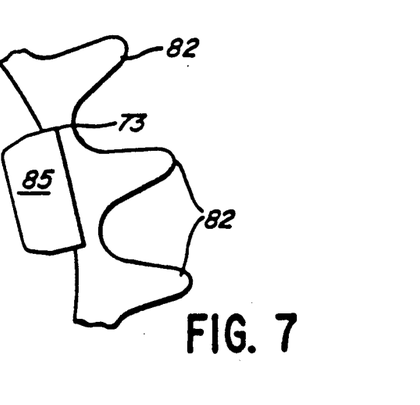
FIG. 7 is an enlarged view of a portion of FIG. 6.

The mechanical structure of a stepper motor system in accordance with the principles of the present invention is illustrated in FIGS. 4 and 5. Referring to FIG. 4, it is seen that the stepper motor 1 includes operating shaft 1a, the movement of which is controlled in accordance with the circuitry described above. At the rear of motor 1 there is provided a housing 81 which includes a number of radially extending fins 82 spaced circumferentially about the cylindrical housing. Fins 82 operate as the external part of heat sinking system, which will be described in detail below, for components that are enclosed within the housing. As further illustrated in FIG. 4, within housing 81 there is enclosed hybrids 83 and 84, that are mounted within the enclosure formed by housing 81. The hybrids 83 and 84 are comprised of electrically insulating and thermally conductive substrates shaped in the form of a disc, metallization layers forming thick film and thin film components, monolithic semiconductors, other hybridized circuits and discrete components connected to the substrates. Mounted on hybrid 83 are power transistors 85-92. Transistors 85 and 86 are utilizes with lead 1a of motor winding 2; transistors 87 and 88 are utilized with lead 1b of motor winding 2; transistors 89 and 90 are utilized with lead 2b of motor winding 2; and transistors 91 and 92 are utilized with lead 2a of motor winding 2. Each of the power transistors is fitted into a recess 93 as shown in FIG. 7 and defined by the inside wall 81a of metal housing 81 and fins 82, with the housing 81 and fins 82 operating as a heat sink for the respective transistor.

The hybrids 83 and 84, which contain the circuitry shown in FIGS. 1A-1B, are connected together by an electrical cable 94, as shown in FIG. 10, via connector 94a and 94b, and then folded and attached to a circular heat sink 95 in the manner described below.

Figure 6:
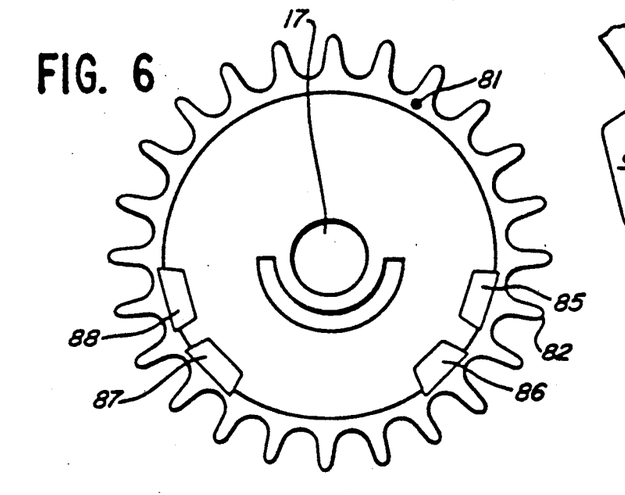
FIG. 6 is a cross-sectional view thereof, taken along the plane of the line 6—6 of FIG. 4.
Figure 11:
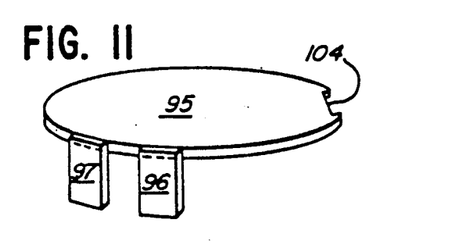
FIG. 11 is a perspective view of a heat sink constructed in accordance with the present invention.
Figure 12:
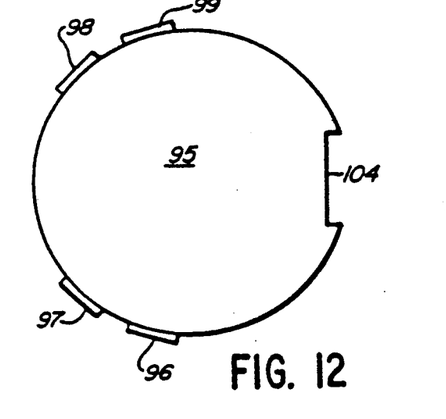
FIG. 12 is a top view of FIG. 11.

Heat sink 95, as illustrated in FIGS. 11 and 12, is the interior part of a heat sinking system for the components that are enclosed within the inside wall 81a of housing 81, and acts as a thermal path to allow heat to travel from the individual components on the thermal conductive substrates of hybrids 83 and 84 out to housing 81 and the cooling fins 82. Heat sink 95 comprises a metal plate formed in the shape of a disc, a notch 104 at one end of the plate, metal tabs 96-103 attached to the outer rim of the plate, whereby tabs 96-99 are attached to the rim of the plate on one side of notch 104, and tabs 100-103 are attached to the rim of the plate opposite tabs 96-99. The spacing between each of the tabs, such as the space between tab 96 and tab 97, is such that each tab can be securely fitted into one of the recesses occupied by transistors 85 through 92, as illustrated in FIGS. 6 and 7, during final assembly. For example, tab 96 occupies the same recess as transistor 85, tab 97 the same recess as transistor 86.

Figure 13:
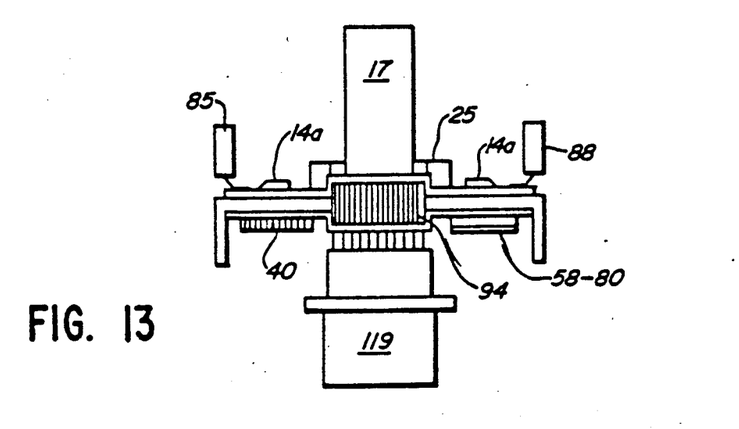
FIG. 13 is a side elevational view of FIG. 10 attached to FIG. 11 in accordance with the present invention.

As illustrated in FIG. 13, the bottom of hybrid 83 is firmly attached to the top of heat sink 95, whereby transistors 85-92 connected to the top surface of hybrid 83 are vertically aligned with tabs 96-103 of FIG. 12, respectively, and air gaps between substrate of hybrid 83 and surface of heat sink 95 are minimized. Hybrid 84, which is connected to hybrid 83 by way of cable 94, is folded in a manner whereby cable 94 fits into notch 104 of heat sink 94 and the bottom of hybrid 84 is firmly attached to the bottom surface of heat sink 95. By firmly attaching substrate of hybrid 84 to the bottom surface of heat sink 95, air gaps between the hybrid and the heat sink are minimized. Assembly in this manner will result in capacitor 18 being vertically aligned with connector 119.

Referring to FIG. 13, it can be seen that by assembling hybrid substrates 83 and 84 to heat sink 95 in the manner described above, a very efficient package has been created. The form of the package allows for efficient heat dissipation of hybrids 83 and 84. In addition, the package allows automatic assembly and testing of the unit prior to final assembly. Further, securing the unit in housing 81 is accomplished by sliding the unit into housing 81 whereby transistors 85-92 and tabs 96-103, respectively, are fitted into the appropriate recesses, such as recess 93, of housing 81, and potting the unit permanently in place with a thermally conductive compound. There is no manual wiring. All connections are automatic. No screws are required to attach the unit to housing 81. Rear cover plate 105, as shown in FIG. 5, is fitted into place immediately after potting. After curing of the potting compound, the components will be securely held in place by the potting compound. The only movement inside the hybrid block will be the very slight thermal expansion and contraction movements of the semiconductors at their solder junctions.

Figure 8:
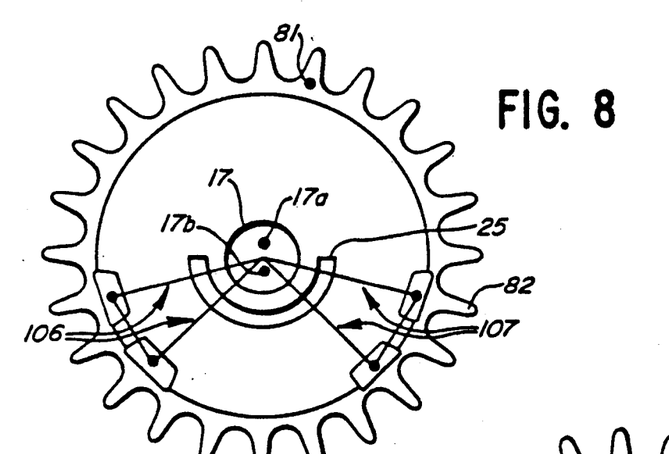
FIG. 8 is similar to FIG. 6 but shows critical paths.
Figure 9:
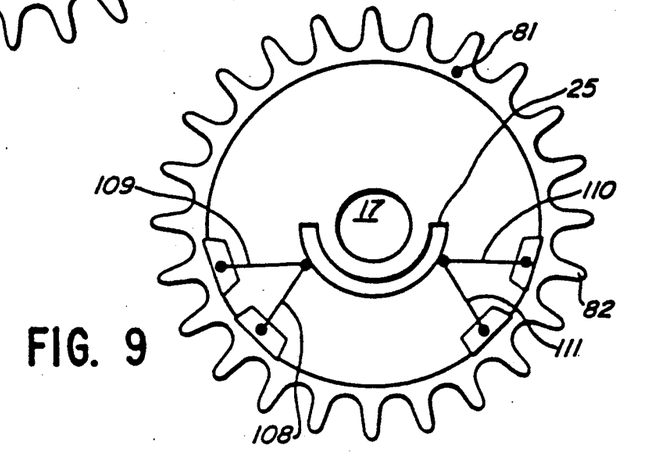
FIG. 9 is similar to FIG. 8 but shows additional critical paths.

As illustrated in FIG. 6, filter capacitor 18 is connected to the center of hybrid 83 at positive voltage receptacle 18a and common receptacle 18b. Phase drive circuitry 25a i s attached to hybrid 83 on one side of filter capacitor 18, and phase drive circuitry 25b is attached to hybrid 83 on the side of filter capacitor 18 that is opposite phase drive circuitry 25a. As illustrated in FIGS. 6-10, it is preferred that the power transistors 85–92 be located in a circular pattern surrounding the positive voltage receptacle 18a, common receptacle 18b, filter capacitor 18 and phase drive circuitry 25a and 25b. FIG. 8 shows the four critical paths 106–109 of current between the source of motor power, receptacles 18a and 18b, filter capacitor 18, and the two transistors that comprise one of the two legs of each phase of the motor. It is preferred that each of these critical paths 106–109 be three inches or less in length and be the same length. Furthermore, FIG. 9 shows a second series of critical lengths. It is preferred that the leads 110–117 between the phase drive circuitry 25a and 25b, respectively, and the power transistors 85–92 be less than one inch in length and be equal in length. The arrangement of the hybrids' components as described above results in a circuit that is capable of much higher speeds and resolutions than possible with a conventional driver that is constructed using printed circuit board techniques. Short and similar lead lengths are a critical part of eliminating the parasitic oscillations that can occur in longer or uneven leads. These oscillations can severely restrict the degree of control that control circuitry 25a and 25b has over switcher 3 and power transistors 85–92.

It can be seen from the illustrated embodiment that a stepper motor system has been provided in which the driver is located on the motor itself, and includes all circuitry necessary for the operation of the stepping motor including switcher with power transistors, phase drive circuitry, translator circuitry, translator control circuitry, temperature and current acquisition circuitry, logic level and high voltage power supply, and optical isolation units. This enables the total package size of the stepper motor/driver combination to be substantially reduced when compared to the prior art. The reduction in size is significant to an end user wanting to reduce the size and weight of a product, thereby improving a product's manufacturing cost, market appeal and performance. Further, significant weight reductions have profound implications in the aerospace and aviation industries where stepper motor systems have heretofore been considered an unacceptable positioning system for airplane or rocket avionics.

By removing bulky transformers, capacitors, numerous heat sinks, as well as numerous other power supply, connection and support components from the system and packaging the entire drive system in a single potted circuit block which is enclosed in a unitary housing with the motor, there are many benefits for the user beyond weight reduction. For example, there is provided a significantly safer working environment. This is because there is no possible way for a human or an outside piece of machinery to come into contact with the drive electronics through direct contact with the drive circuitry or with the high voltage traces connecting the drive circuitry to the motor. Since the drive circuitry is in a hermetically sealed block which is in turn sealed inside of the motor enclosure, there is no chance for any circuit short, or malfunction, to cause a spark, nor is there a way for any outside agent to effect the circuitry. This enables the use of the system in an extremely hostile environment, such as flammable, corrosive and humid environments.

By placing the microcomputer based hybrid driver system in direct contact with the motor's windings, a significant number of operating improvements are achieved. Because there is no cable connecting the driver to the motor and since the conductor length between the motor windings and drive circuitry have been reduced, preferably to less than two inches, and in addition have been well shielded both internally and through the motor shell itself, as well as having very tightly defined inductance values achieved through laser trimming of the conductors, the microcomputer which is contained within the drive circuitry package can monitor very small changes in the motor coil's inductance and resistance. The microcomputer can also monitor changes in the temperature of the motor's windings and shell, as well as changes in temperature of the circuitry contained in the hybrid block, the temperature of the heat sink and the external temperature, to make changes in the stepping control patterns sent to the switcher to compensate for variations in the motors environment and load requirements. This allows the stepper motor to safely run more accurately, with higher resolution and at faster speeds than in prior art systems.

Further, by monitoring motor changes, the internal microcomputer can be programmed to optimize the current flowing to each motor winding in order to allow the motor to be able to deliver its maximum potential torque at all times. This is a real torque value, which is not a calculated or maximum value as stated by the original motor manufacture, but one that is constantly redetermined by the microcomputer under actual operating conditions. This torque value will frequently be higher than the manufacturer's rated running torque. With proper cooling to the motor, the drive circuitry of the present invention is capable of delivering substantial increases in torque over prior art systems.

By using the heat dissipating system of the present invention, the heat dissipation is greatly improved, allowing higher power circuitry to be used in the system. By mounting the driver circuitry on thermally conductive substrates which are then attached to the heat sink, and attaching some of the discrete semiconductors on the substrate directly to the heat sink, and encasing the substrate, components and heat sink in a unified block of thermally conductive potting compound, it is possible to package a driver capable of relatively high output power in a package greatly smaller than the current state of the art low power devices.

In hybridization, resistors, inductors, capacitors and conductors in a circuit are formed directly onto the substrate material. Further, the manufacturing process allows for the functional testing and trimming of the components values for optimal circuit response. By eliminating all of the variables of the manufacturing process, such as variable component values, it is possible to obtain a very accurate drive circuit that would allow the microcomputer to monitor very small changes in the operation of the circuitry within the system and directly attribute these changes to specific outside influences. The microcomputer can then make corrections and or compensations for them. This level of control of motor and driver responses is only possible as a result of the hybridization of the motor/driver circuit.

Very short conductor lengths, as well as optimal trace inductances are possible in the hybrid driver system of the present invention. This is important at the high operating speeds found in micro stepping drive circuitry where errors in frequency and phase characteristics, as well as parasitic oscillations caused by mismatched inductors, can have a detrimental effect on the absolute accuracy of the individual micro step. By hybridizing all drive circuitry thereby removing all the variables in the circuit created by the use of subcomponents mounted on printed circuit boards, and by removing error inducing cabling and by constantly monitoring the actual performance of the motor and changing the drive parameters accordingly, the absolute accuracy of the individual micro step is greatly improved.

By including an indexer and encoder system in hybridized form in the same enclosure as a hybridized driver and locating the enclosure on the motor itself, a completely self contained closed loop stepper motor system is provided that has notable improvements in performance and flexibility over conventional stepper motor systems, and is substantially light in weight and small in size when compared with conventional stepper motor systems.

Although an illustrative embodiment of the invention has been shown and described, it is to be understood that various modifications and substitutions may be made by those skilled in the art without departing from the novel spirit and scope of the present invention.

What is claimed is:

1. A stepper motor system which comprises:
    a DC motor;
    driver means for controlling the motor actions;
    memory means;
    means for sensing operating parameters of the system on a moment by moment basis and for providing data to said memory means;
    means for providing a plurality of user-stipulated operating parameters during use of the motor system;
    means for sensing a plurality of user-stipulated operating parameters on a moment by moment basis and for providing data to said memory means;
    computing means for using said memory means to create, on a moment by moment basis, a new set of operational limiting parameters; and
    means for transmitting said new set of operational limiting parameters to said driving means on a moment by moment basis to control the motor actions.

2. A stepper motor system as defined by claim 1, including driver control means for enabling the user to control the degree of position change, the speed of position change and the acceleration of the position change.

3. A stepper motor system as defined by claim 1, including a common housing for said driver means and sensing means, said housing comprising a metallic enclosure shielding against electrical noise; and means connecting said housing to the back of said motor to form a compact, unitary device.

4. A stepper motor system as defined by claim 1, in which said means for sensing operating parameters includes encoder means for sensing the position and velocity of the motor and for providing an output signal responsive thereto.

5. A stepper motor system as defined in claim 4, including a common enclosure for housing said driver means and encoder means to increase the accuracy of the positioning of the motor.

6. A stepper motor system as defined in claim 1, including a common housing for said driver means, sensing means, and computing means, said housing comprising a metallic enclosure shielding against electrical noise; and means connecting said housing to the back of said motor to form a compact, unitary device.

7. A stepper motor system as defined in claim 1, said driver means being miniaturized using a combination of hybrid circuits, monolithic semiconductor devices and discrete components connected to at least one substrate.

8. The method of operating a stepper motor, which comprises the steps of:
    providing a DC motor;
    providing driver means for controlling the motor actions;
    sensing operating parameters of the system on a moment by moment basis;
    providing data relating to said operating parameters to memory means;
    during use of the motor system, providing a plurality of user-stipulated operating parameters;
    sensing said user-stipulated operating parameters on a moment by moment basis;
    providing data relating to said user-stipulated operating parameters to said memory means;
    using the memory means to create, on a moment by moment basis, a new set of operational parameters; and
    transmitting said new set of operational parameters to said driver means on a moment by moment basis to control the motor actions.

* * * * *